United States Patent
Mazur et al.

(10) Patent No.: US 11,750,715 B2
(45) Date of Patent: Sep. 5, 2023

(54) INDUSTRIAL AUTOMATION BROKER DEVICE

(71) Applicant: Rockwell Automation Technologies, Inc., Mayfield Heights, OH (US)

(72) Inventors: David C. Mazur, Mequon, WI (US); Rob A. Entzminger, Shawnee, KS (US); Corey A. Peterson, Grafton, WI (US); John A. Kay, Kitchener (CA)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 318 days.

(21) Appl. No.: 16/932,203

(22) Filed: Jul. 17, 2020

(65) Prior Publication Data
US 2022/0019199 A1    Jan. 20, 2022

(51) Int. Cl.
*H04L 12/70* (2013.01)
*H04L 67/565* (2022.01)
(Continued)

(52) U.S. Cl.
CPC ...... *H04L 67/565* (2022.05); *G05B 19/41835* (2013.01); *H04L 67/12* (2013.01); *H04L 69/08* (2013.01); *G05B 2219/31229* (2013.01)

(58) Field of Classification Search
CPC ....... H04L 67/565; H04L 67/12; H04L 69/08; G05B 19/41835; G05B 2219/31229;
(Continued)

(56) References Cited

U.S. PATENT DOCUMENTS

| 2007/0280285 A1* | 12/2007 | Vanderah | ............... | H04L 12/66 370/466 |
| 2015/0316923 A1* | 11/2015 | Strilich | .................. | H04L 67/12 700/11 |

(Continued)

FOREIGN PATENT DOCUMENTS

| EP | 1675312 A1 * | 6/2006 | .......... H04L 12/417 |
| EP | 1675312 A1 | 6/2006 | |
| WO | 2017035536 A1 | 3/2017 | |

OTHER PUBLICATIONS

Extended European Search Report for European Patent Application No. EP 21184245.5, dated Dec. 8, 2021, 9 pages.
(Continued)

*Primary Examiner* — Joe Chacko
*Assistant Examiner* — Elizabeth Kassa
(74) *Attorney, Agent, or Firm* — Fletcher Yoder, P.C.

(57) ABSTRACT

A system for performing industrial automation control may include a first device that generates a first set of data formatted according to a first protocol and a second device that generates an automation command. The automation command may control the first device based on the first set of data. The second device may interpret data formatted according to a second protocol. The system may include a broker system coupled between the first device and the second device to transform data communicated between the devices, such as the first set of data, the automation command, or both. For example, the broker system may transmit a set of data generated to communicate the first set of data to the second device formatted according to the second protocol as opposed to being formatting according to the first protocol.

20 Claims, 4 Drawing Sheets

(51) Int. Cl.
  *G05B 19/418* (2006.01)
  *H04L 67/12* (2022.01)
  *H04L 69/08* (2022.01)
(58) Field of Classification Search
  CPC .......... G05B 2219/31129; G05B 2219/31174; G05B 19/4186; G05B 19/4185; G05B 2219/31088
  USPC ........................................................ 370/466
  See application file for complete search history.

(56) References Cited

U.S. PATENT DOCUMENTS

| | | | | |
|---|---|---|---|---|
| 2016/0274978 | A1* | 9/2016 | Strohmenger | G05B 15/02 |
| 2018/0167476 | A1* | 6/2018 | Hoffner | H04L 67/55 |
| 2019/0339682 | A1* | 11/2019 | Weinrich | G05B 23/0267 |
| 2019/0349426 | A1* | 11/2019 | Smith | H04L 61/4505 |
| 2020/0103894 | A1* | 4/2020 | Celia | G05B 23/0264 |
| 2021/0092097 | A1* | 3/2021 | Law | H04L 63/0209 |
| 2021/0117251 | A1* | 4/2021 | Cristofi | G06F 9/542 |
| 2022/0046095 | A1* | 2/2022 | Petit | H04L 12/66 |
| 2022/0121597 | A1* | 4/2022 | Nasu | G06F 9/48 |

OTHER PUBLICATIONS

A. Sahadevan, D. Mathew, J. Mookathana, and B. A. Jose, "An Offline Online Strategy for IoT Using MQTT," in 2017 IEEE 4th International Conference on Cyber Security and Cloud Computing (CSCloud), 2017, 5 pages.
N. Tantitharanukul, K. Osathanunkul, K. Hantrakul, P. Pramokchon, and P. Khoenkaw, "MQTT-Topics Management System for Sharing of Open Data," in 2017 International Conference on Digital Arts, Media and Technology (ICDAMT), 2017, 4 pages.
N. Naik, "Choice of effective messaging protocols for IoT systems: MQTT, CoAP, AMQP and HTTP," in 2017 IEEE International Systems Engineering Symposium (ISSE), 2017, 7 pages.
J. Bartnitsky, "HTTP vs MQTT performance tests," Available: https://flespi.com/blog/http-vs-mqtt-performance-tests, 2019, 4 pages.
R. Bryce, T. Shaw, and G. Srivastava, "MQTT-G: A Publish/Subscribe Protocol with Geolocation," in 2018 41st International Conference on Telecommunications and Signal Processing (TSP), 2018, 4 pages.
Flespi Platform, "HTTP vs MQTT performance tests Including 3G," Available: https://medium.com/@flespi/http-vs-mqtt-performance-tests-f9adde693b5f, 2019, 4 pages.
P. Alqinsi, I. J. M. Edward, N. Ismail, and W. Darmalaksana, "IoT-Based UPS Monitoring System Using MQTT Protocols," in 2018 4th International Conference on Wireless and Telematics (ICWT), 2018, 5 pages.
T. Konglong, W. Yong, L. Hao, S. Yanxiu, W. Xi, and W. Zhiqiang, "Design and Implementation of Push Notification System Based on the MQTT Protocol," in 2013 International Conference on Information Science and Computer Applications (ISCA 2013), 2013, 4 pages.
O. Oladehin, "Designing MQTT Topics for AWS IoT Core," Amazon Web Services, Inc., May 1, 2019, 29 pages.
J. Park, S. Yun, H. Kim, and W. Kim, "Emergent-MQTT over SDN," in 2017 International Conference on Information and Communication Technology Convergence (ICTC), 2017, 3 pages.
J. Toldinas, B. Lozinskis, E. Baranauskas, and A. Dobrovolskis, "MQTT Quality of Service versus Energy Consumption," in 2019 23rd International Conference Electronics, 2019, 4 pages.
W. Su, W. Chen, and C. Chen, "An Extensible and Transparent Thing-to-Thing Security Enhancement for MQTT Protocol in IoT Environment," in 2019 Global IoT Summit (GIoTS), 2019, 4 pages.
M. Singh, M. A. Rajan, V. L. Shivraj, and P. Balamuralidhar, "Secure MQTT for Internet of Things (IoT)," in 2015 Fifth International Conference on Communication Systems and Network Technologies, 2015, 6 pages.
C. Bernstein, K. Brush and A.S. Gillis, "MQTT (MQ Telemetry Transport)," Available: https://internetofthingsagenda.techtarget.com/definition/MQTT-MQ-Telemetry-Transport, 2019, 7 pages.

\* cited by examiner

INDUSTRIAL AUTOMATION BROKER DEVICE

BACKGROUND

The disclosure relates generally to systems and methods for controlling devices within an industrial automation system. More particularly, embodiments of the present disclosure are related to systems and methods for a broker system that may translate sensed data, statuses, or the like between industrial automation devices and control devices of an industrial automation system to deployment of control and communication systems within an industrial environment.

Industrial automation systems are managed and operated using automation control and monitoring systems, particularly in industrial automation environments. Such applications may include the powering of a wide range of actuators, such as valves, electric motors, and so forth, and the collection of data via sensors. Automation control and monitoring systems may include one or more components, such as programming terminals, automation controllers, input/output (I/O) modules, communication networks, human-machine interface (HMI) terminals, and the like to control operations of the industrial automation systems.

Generally, communication systems are deployed in industrial automation systems to permit industrial automation devices to communicate with the control and monitoring systems. However, some industrial automation systems are limited in control of devices by hardwired connections or programmed communicative pathways. These hardwired connections or programmed communicative pathways may be time-consuming to maintain and difficult to deal with when replacing components or adding new components into the system, since rewiring is sometimes performed to make room for new components. Furthermore, respective control systems and/or monitoring systems may each translate signals from industrial automation devices at intake, causing system-wide repetition of translation operations. These translation operations may be inefficient since each control and monitoring system receiving data from the industrial automation device may repeat the same (or similar) translation. As such, improved systems and methods for translation operations of an industrial automation system are desirable.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include a first industrial automation device that may generate a first set of data formatted according to a first protocol and a second industrial automation device that may generate an automation command. The automation command may be used to control the first industrial automation device based at least in part on the first set of data. The second industrial automation device may interpret data formatted according to a second protocol as opposed to the first protocol. The system may include a broker system coupled between the first industrial automation device and the second industrial automation device. The broker system may receive the first set of data from the first industrial automation device according to the first protocol. The broker system may convert the first set of data from the first protocol to a third protocol thereby generating a second set of data according to the third protocol. The broker system may store the second set of data in a storage component. In response to determining that the second industrial automation device is seeking the first set of data, the broker system may convert the second set of data from the third protocol to the second protocol thereby generating a third set of data. The broker system may transmit third set of data to the second industrial automation device according to the second protocol.

In another embodiment, a method includes receiving, via a processor, a first set of data formatted according to a first protocol from a first device. The first device may generate the first set of data in response to receiving a first control signal from the processor. The method may also include generating, via the processor, a second set of data formatted according to a second protocol based at least in part on the first set of data. The method may further include storing, via the processor, the second set of data in a storage component and generating, via the processor, a third set of data formatted according to a third protocol based on the second set of data. Generating the third set of data may occur in response to detecting that a second device is a subscriber of the first set of data. The second device may operate based on data formatted according to the third protocol. The method may include transmitting, via the processor, the third set of data to the second device. The second device may generate a second control signal formatted according to the third protocol for transmission to the broker system based on the third set of data.

In yet another embodiment, a non-transitory computer-readable storage medium, comprising processor-executable routines that, when executed by a processor, cause the processor to perform operations including receiving a first set of data formatted according to a first protocol from a first device. The first device may generate the first set of data as part of a sensing operation performed by the first device. The operations may include generating a second set of data formatted according to a second protocol based on the first set of data. The operations may also include generating a third set of data formatted according to a third protocol based on the second set of data. The operations may also include transmitting the third set of data to a second device that may operate according to the third protocol. The second device may determine an adjustment to be applied to an operation of the first device, a third device, or both based on the third set of data.

DRAWINGS

These and other features, aspects, and advantages of the present disclosure may become better understood when the following detailed description is read with reference to the accompanying drawings in which like characters represent like parts throughout the drawings, wherein.

DETAILED DESCRIPTION

Figure 1:
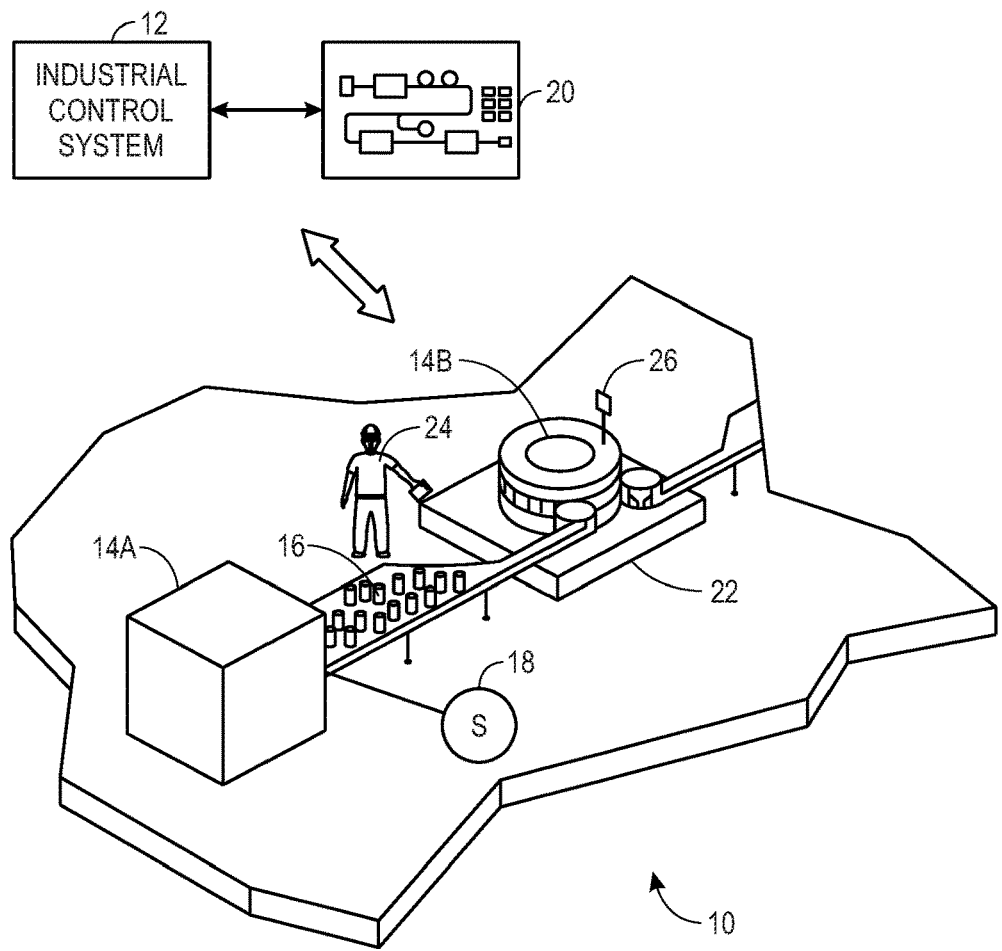
FIG. 1 is a perspective view of an example industrial automation system, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is generally directed toward a broker system disposed in an industrial automation system that may receive data from an industrial automation device and transmit the data to a control system. Communication systems are sometimes deployed in industrial automation systems to support the communication of data between control systems and industrial automation devices. However, some industrial automation systems are limited to using hardwired connections or certain specific communication protocols (e.g., wired or wireless) to transmit or receive data from devices. These physical or wireless communicative couplings may be difficult or time-consuming to maintain over the lifespan of the industrial automation system, since, for example, each coupling between devices may be updated each time a replacement or a repair is made. Furthermore, when communicating information between end points that use different communication protocols, respective devices within the industrial automation system may translate signals from other devices at intake of the signals. Since each device may perform its own translation operations, repetition of the translation operations may occur. Furthermore, if one device is operating on an outdated firmware or software version and/or otherwise does not have the capability to receive communications formatted according to a protocol used by a different device, those two devices may not be able to communicate.

With this in mind, operation of the industrial automation system may improve through use of the broker system. For example, the broker system may centralize translation operations and support a publish-subscribe system of reporting between the control systems and industrial automation devices. The broker system may reduce a number of translation operations performed by leveraging a common protocol (e.g., common protocol and/or common communication format) and data storage. The broker system may also store a library of data translations to permit conversion between different formats. In this way, data from the industrial automation device may be translated to the common protocol and stored before transmission to the control system. When transmitting stored data to the control system, the broker system may translate the stored data from the common protocol into a protocol used by the control system, thereby reducing a number of translations (e.g., a total number of translations) performed by the control systems. Indeed, when the data corresponding to the stored data is subscribed to by multiple control systems, the data is translated (e.g., translated to the common protocol) once instead of multiple times by each of the multiple control systems.

Respective controls systems and respective industrial automation devices may use different communication protocols when communicating information between components of the control systems and/or industrial automation devices. The broker system may thus be capable of translating between a variety of communication protocols and the common protocol. When receiving data from the industrial automation device, the broker system may translate the received data to the common protocol and store the received data. The broker system may translate the stored data from the common protocol to a communication protocol used by the control system for analysis and control operations.

In some cases, the control system may subscribe to data received by, stored on, or accessible to the broker system. For example, the control system may subscribe to a particular type of data that is accessible to the broker systems and may automatically receive the specified type of data from the broker system. The broker system may directly transmit the data to the control system, such as through dedicated data channels coupling between the control system and the broker system.

In some cases, the broker system may communicate with the control system through a network channel. The network channel may be associated with internet protocol (IP) communications and may enable one or more devices coupled to the network channel to selectively receive information transmitted through the network channel, such as based on properties of data (e.g., an identifier of the data, metadata describing the data and transmitted with the data). In this way, the broker system may receive data from the industrial automation device, translate the data, and publish the translated data to a network channel. The control system may couple to the broker system through the network channel and determine when relevant or subscription data is transmitted through the network channel, such as based on an interpretation of the properties of the data. In some systems, however, the network channel may route data to the control system based on subscriptions of the control system, may send some or all data to the control system based on what data is transmitted to the network channel by the broker system, or the like. In any of these cases, however, data is transmitted from the industrial automation device and the control system using the broker system that is able to translate the data between communication formats of the respective components.

Sometimes the broker system may facilitate bi-directional communication between control systems and industrial automation devices. Indeed, control systems may generate data, control signals, or the like to be transmitted to industrial automation devices, such as to implement a control operation within the industrial automation system. The broker system may also transmit these communications from the control system to the industrial automation device. In this way, the control system may generate a control signal that the broker system transmits to the industrial automation device to adjust operations of the industrial automation device.

It is noted that control systems and industrial automation devices represent two examples of suitable components that may use the broker system to manage communications. However, a variety of devices may benefit from usage of broker systems in an industrial automation system. For example, control systems, human machine interfaces, motor control centers, alarm management systems, internet-of-things (JOT) component systems, manufacturing execution systems (IVIES), time-series data repository systems, supervisory control and data acquisition (SCADA) systems, or the like may each interact with one or more industrial automation devices via communication with the broker system.

With the foregoing in mind, the broker system may use Message Queuing Telemetry Transport (MQTT) methods with translating communications between components. The MQTT platform uses a client device (e.g., components) and a broker (e.g., the broker system) to enable intercommunications. Each outgoing communication from the client device is transmitted through the broker and routed by the broker to a different client device (e.g., node). The MQTT platform may support uni-directional and bi-directional communications, and thus may suitably implement the broker system described herein.

Indeed, the broker system may couple a variety of components that may each respectively use disparate data types and disparate communication protocols when operating. The broker system may enable communication between the variety of components due to its translation operations. Furthermore, some of the components coupled to the broker system may use uni-directional communications (e.g., single direction communications), some may use bi-directional communications (e.g., two-way communications), and some may switch based on an operational mode of the component. In this way, the broker system may provide a robust and versatile communication solution to industrial automation systems. Additional details with regard to the operations of the broker system will be described below with reference to FIGS. 1-6.

By way of introduction, FIG. 1 is a perspective view of an example industrial automation system 10 that may include a broker system to translate communications of the industrial automation system 10, as described herein. The industrial automation system 10 include individual components controlled by an industrial control system 12. The components may relate to various industrial equipment such as mixers, machine conveyors, tanks, skids, specialized original equipment manufacturer machines, and the like. The components may also be associated with devices used by the equipment such as scanners, gauges, valves, flow meters, and the like. In one embodiment, every aspect of the components may be controlled or operated by a single controller (e.g., the industrial control system 12). In some embodiments, the components may include devices such as individual industrial automation components, such as controllers, input/output (I/O) modules, motor control centers, motors, human machine interfaces (HMIs), operator interfaces, contactors, starters, sensors, drives, relays, protection devices, switchgear, compressors, network switches (e.g., Ethernet switches, modular-managed, fixed-managed, service-router, industrial, unmanaged, etc.) and the like. In another embodiment, the control and operation of each aspect of the components may be distributed via multiple controllers (e.g., the industrial control system 12). In addition, the industrial automation system 10 may include stations having machine components and/or machines to conduct a particular function within an automated process, for example, an automated assembly line. The example automated process of the industrial automation system 10 may begin at a station 14A used for loading objects, such as empty cans or bottles to be filled, into the industrial automation system 10 via a conveyor section 16. The conveyor section 16 may transport the objects to a station 14B to perform a first action, for example, washing the empty cans and/or bottles. As objects exit from the station 14B, the conveyor section 16 may transport the objects to subsequent stations 14 to continue the manufacturing or assembly process. Clearly, for other applications, the particular system, machine components, machines, stations, and/or conveyors may be different or specially adapted to the application. In addition to the equipment described above, the industrial automation system 10 may also include motors, protection devices, switchgear, compressors, and the like.

One or more properties of components of the industrial automation system 10 may be monitored and controlled by an industrial control system 12 for regulating control variables. For example, sensing devices (e.g., sensors 18) may monitor various properties of the industrial automation system 10 and generate outputs used during adjustments of the operation of the industrial automation system 10. Scanners, gauges, valves, flow meters, and the like of the industrial automation system 10 may each generate sensing data used by the industrial control system 12 when determining adjustments to one or more operations of the industrial automation system 10. These adjustments may be managed via control loops. For example, a control loop may include a control system of the industrial automation system 10 may be associated with a motor drive, and thus may receive data regarding a temperature of the motor drive and may adjust operations of the motor drive based on the temperature.

The industrial control system 12 may be communicatively coupled to a display/operator interface 20 (e.g., a human machine interface (HMI)) and to one or more devices of the industrial automation system 10. The industrial control system 12 may represent components of the industrial automation system 10 through visualizations of the components on the display/operator interface 20. The industrial control system 12 may use data transmitted by sensors 18 to update visualizations of the components via changing one or more indications of current operations of the components. These sensors 18 may be any device adapted to provide information regarding process conditions. An operator 24 monitoring the industrial automation system 10 may reference the display/operator interface 20 to determine various statuses, states, and/or current operations, such as when adjusting operations of the industrial automation system 10 and/or for a particular component.

The industrial control system 12 may use networked devices 26 in managing operation of the industrial control system 12. The networked devices 26 may be any suitable device within the industrial automation system 10 that communicates a status, a data packet, an alert, or the like, to the industrial control system 12 and/or to other networked devices 26. The networked devices 26 may each include processing circuitry coupled to an example sensor 18 that enables transmission of sensing data to the industrial control system 12.

The network of the industrial control system 12 may be a wired network, a wireless network, or a combination of the two. However, when deploying communicative couplings between components of the industrial control system 12, it may be desirable to use a broker system to manage the communications. Indeed, the broker system may enable communication between components that otherwise use disparate communication protocols.

Figure 2:
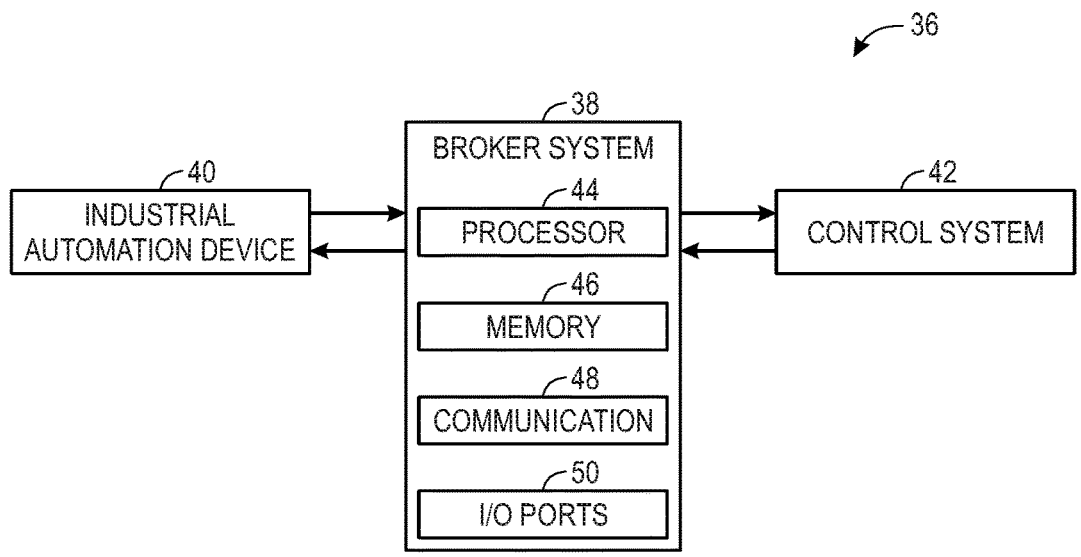
FIG. 2 is a block diagram of a broker system of the industrial automation system of FIG. 1, in accordance with an embodiment.

To help elaborate, FIG. 2 is a block diagram representation of an example network 36 of the industrial automation system 10 that includes a broker system 38 to manage communications between an industrial automation device 40 and a control system 42. The broker system 38, the industrial automation device 40, and the control system 42 may each include circuitry to perform operations. For example, the broker system 38 may include a processor 44, memory 46, a communication component 48, input/output ports (I/O ports) 50, and the like. The industrial automation device 40, the control system 42, and/or any other suitable device of the industrial automation system 10, may also include a processor 44, memory 46, communication component 48, I/O ports 50, or the like.

The communication component 48 may use wireless communication or wired communication to transmit data and/or receive data from other components, wireless networks, wired networks, or the like. For the particular example of the broker system 38, the broker system 38 may receive information from the industrial automation device 40, the control system 42, or the like via the I/O port 50. This wired communication protocol or wireless communication protocol may include any suitable communication protocol, such as WI-FI®, mobile telecommunications technology (e.g., 2nd generation (2G), 3rd generation (3G), 4th generation (4G), 5th generation (5G), long-term evolution (LTE)), BLUETOOTH®, near-field communications technology, and the like. The communication component 48 may include a network interface to enable communication via various protocols such as ETHERNET/IP®, CONTROLNET®, DEVICENET®, MODBUS®, or any other industrial communication network protocol.

The processor 44 may be any suitable type of computer processor or microprocessor capable of executing computer-executable code, including but not limited to one or more field programmable gate arrays (FPGA), application specific integrated circuits (ASIC), programmable logic devices (PLD), programmable logic arrays (PLA), a programmable automation controller (PAC), or any other controller that may monitor, control, and operate an industrial automation device or component. The processor 44 may, in some embodiments, include multiple processors. The memory 46 may include any suitable articles of manufacture that serve as media to store processor-executable code, data, and the like. The memory 46 may store processor-executable code used by the processor 44 to perform the presently disclosed techniques.

In some cases, the broker system 38 may wirelessly communicate with the control system 42 and communicate via wired connections with the industrial automation device 40. However, any combination of wired communication and wireless communication may be permitted. For example, the broker system 38 may transmit data using a wired connection to the control system 42 and may transmit data using a wireless connection to the industrial automation device 40, or vice versa. Some control systems 42 may use wired connections to communicate with the broker system 38 and some control systems 42 may use wireless connections to communicate with the broker system 38. Furthermore, some industrial automation devices 40 may use wired connections to communicate with the broker system 38 and some industrial automation devices 40 may use wireless connections to communicate with the broker system 38.

Figure 3:
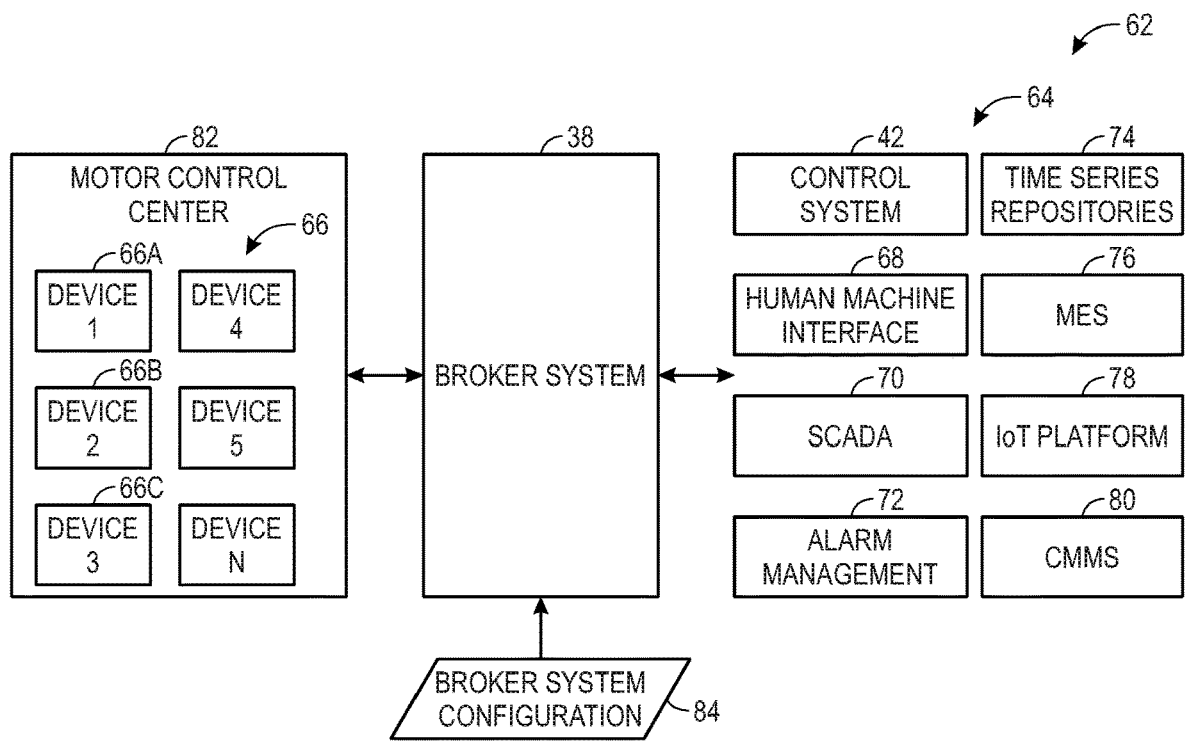
FIG. 3 is a block diagram of an example of the broker system of FIG. 2, in accordance with an embodiment.

FIG. 3 is a block diagram representation of another example network 62 of the industrial automation system 10. The network 62 may include the broker system 38. The broker system 38 may translate communications between one or more control devices 64 and one or more industrial automation devices 66. It is noted that the control devices 64 and/or the industrial automation devices 66 may be similar to the control system 42 and/or the industrial automation device 40 with reference to FIG. 2, and thus references to the components are used herein although not specifically called out with the discussion of FIGS. 3-6.

When using the broker system 38 to enhance communications in the industrial automation system 10, any combination of industrial automation devices 66 and control devices 64 may communicate with each other using the broker system 38. The communication may involve a transmission of data, control signals, status signals, alerts, or the like. Furthermore, communication between the components may be uni-directional, bi-directional, or multi-directional. As an example, a first industrial automation device 66A may generate a status in response to generating a voltage output (e.g., in response to the voltage output exceeding a voltage threshold). The status generated may be transmitted from the first industrial automation device 66A to the broker system 38. The broker system 38 may translate the status from a protocol used by the first industrial automation device 66A to a common protocol, and store the status now in the common protocol in a database associated with the memory 46. When the one or more control devices 64 request the stored status from the broker system 38, the broker system 38 may retrieve the stored status from the memory 46, translate the stored status from the common protocol to a communication protocol used by the one or more control devices 64, and proceed to transmit the status (now in the communication protocol used by the one or more control devices 64) to the one or more control devices 64 that requested the stored status.

There may be many permutations to implementing the industrial automation system 10 that leverages the broker system 38. For example, any suitable control device may be used to communicate to any suitable industrial automation device. Any suitable communication protocol may be used to transmit and/or receive data before or after translation of the data to the common protocol. The memory 46 used by the broker system 38 to store information may be internal to the broker system 38 and/or may be external to the broker system 38. Furthermore, in some cases, both an internal memory and an external memory may be used to store data of the broker system 38.

The one or more control devices 64 may include devices such as the control system 42, a human machine interface (HMI) 68, a supervisory control and data acquisition (SCADA) system 70, an alarm management system 72, a time-series data repository 74, a manufacturing execution supervisory (MES) system 76, an internet-of-things (TOT) platform system 78, a computerized maintenance management (CMMS) system 80, or the like. The HMI 68 may be a display communicatively coupled to a processor 44. The processor 44 may generate graphics data for presentation on the HMI 68. For example, the processor 44 may render a graphical user interface (GUI) on the HMI 68 to communicate one or more data visualizations of data received from the industrial automation device 40 and/or a respective device of the one or more industrial automation devices 66.

By way of example, the one or more industrial automation devices 66 may operate as part of a motor control center 82. Indeed, respective devices of the industrial automation devices 66 may include a motor driver, a branch feeder device, a variable frequency drive, a programmable logic controller, an alternating current (AC) drive, a soft starter, a direct online starter, a metering device, or the like. In this way, a variety of operations may be permitted. For instance, the motor control center 82 may change one or more operations in response to processing a load, such as in response to starting a motor to complete a manufacturing operation. The change in operation of the motor control center 82 may generate data and the data may be transmitted to the broker system 38. After the broker system 38 receives the data, the broker system 38 may translate the data and transmit translated data to one or more control devices 64 for use. For example, the control system 42 may generate control operations in response to receiving the data from the motor control center 82, where the control operations may be used to guide operation of the motor control center 82 to establish setpoints or parameters (e.g., to correct for a deviation of operation from an expected or desired operation). However, the other control devices 64 may use the data to perform different operations. For example, the MES system 76 and/or the CMMS system 80 may monitor for operational changes in the motor control center 82 as a way to track manufacturing operations of the industrial automation system 10. Since the IVIES system 76 and/or the CMMS system 80 may be computerized systems used in manufacturing to track and document the transformation of raw materials to finished products, tracking when a component of the motor control center 82 changes state may indicate to the MES system 76 and/or the CMMS system 80 a location of respective product with respect to a manufacturing process.

Other control devices 64 may perform similar monitoring and/or reporting operations. For example, the time-series data repository 74 may store data collected over time. The time-series data repository 74 may store temperature changes over time, voltage value changes over time, current value changes over time, audio data received over time or generated over time, pressure changes over time, output changes over time, or the like and/or any suitable sensed discrete (e.g., digital) value or suitable sensed analog dataset (e.g., values sensed over time). The SCADA system 70 may receive status and/or data from the industrial automation devices 66 and use the received statues or data to generate control operations and/or to update an HMI (e.g., HMI 68) with the updated statues or data. In this way, the SCADA system 70 may be similar to the control system 42. The IOT platform 78 may help form a wireless communication network between components. The IOT platform 78 may autonomously execute control operations and monitoring operations of interconnected devices associated with the IOT platform 78. The alarm management system 72 may receive data and generate alarm in response to the data from the industrial automation devices 66 being greater than or equal to one or more alarm thresholds. These devices are merely a subset of the wide variety of control devices 64 that may be used to receive data from the industrial automation devices 66.

In some cases, the broker system 38 may receive a broker system configuration 84. The broker system configuration 84 may include an indication of a configuration of the motor control center 82, such as which of the industrial automation devices 66 correspond to a respective operation, component template (e.g., an indication of what industrial automation devices 66 are included in the motor control center 82 and corresponding setpoints and/or configurations for the industrial automation devices), or the like. The broker system 38 may create a model based on the broker system configuration 84. The model may link particular industrial automation devices 66 to particular operations, component templates, or the like associated with the broker system 38. The broker system configuration 84 may also provide publish relationships or subscribe relationships to the broker system 38 beyond the indications provided to the broker system 38 from respective control devices 64. In this way, the broker system 38 may be configured before or after being coupled to one or more control devices 64. Indeed, as may be appreciated, information stored by the broker system 38, included in the broker system configuration 84, or otherwise accessible by the broker system 38 may be leveraged by the broker system 38 to provide a physical unit model of the components associated with and/or communicating via the broker system 38.

As may be appreciated, many suitable arrangements and configurations may be enabled at least in part by the broker system 38. In some cases, for example, the HMI 68 may update a displayed icon in response to a control signal generated by the broker system 38 for transmission to the industrial automation device 66A. The control signal may be generated by the broker system 38 in response to data transmitted from the control system 42, alarm management system 72, SCADA system 70, or the like, such as in response to determining sensed data received from the broker system 38 is greater than a threshold value (or is less than a threshold value). In this way, the HMI 68 may update a status or the display icon in response to the control system 42, the alarm management system 72, the SCADA system 70, or the like, transmitting data to the broker system 38. Indeed, the HMI 68 may subscribe to the broker system 38 to receive data transmitted from the control system 42, the alarm management system 72, the SCADA system 70, or the like.

Figure 4:
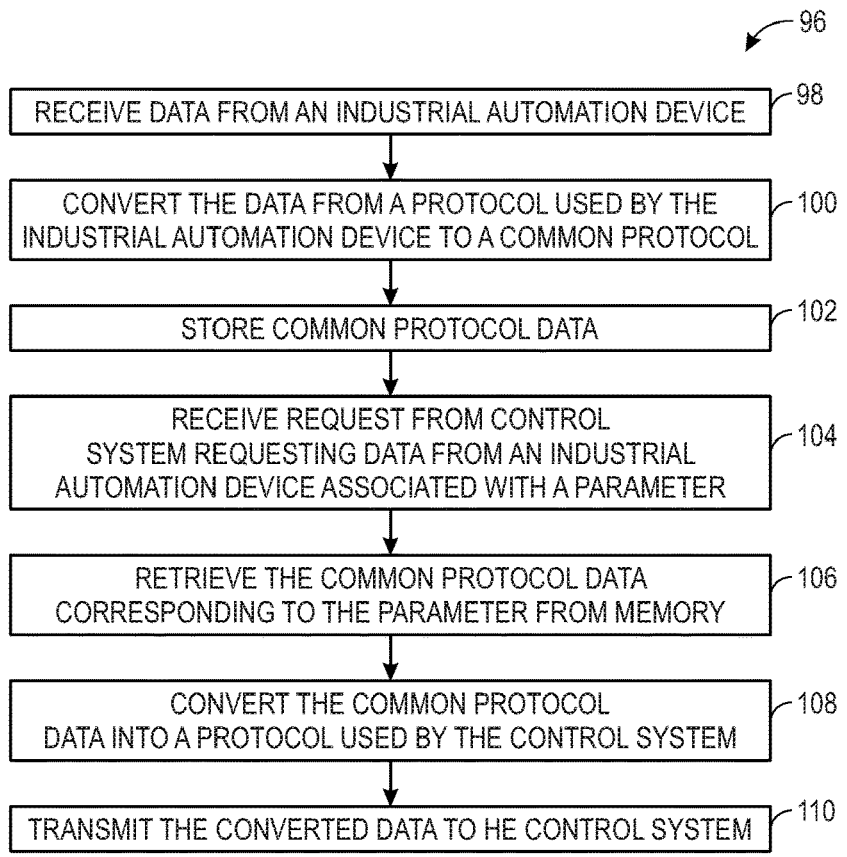
FIG. 4 is a flowchart of a method for converting data from a first communication protocol to a second communication protocol, in accordance with an embodiment.

To elaborate further on communications facilitated by the broker system 38, FIG. 4 is a flowchart of a method 96 for enabling communication via the broker system 38. The method 96 may be performed by the broker system 38 to permit the industrial automation devices 66 to communicate with control devices 64. However, for ease of explanation, an exemplary industrial automation device 66A and control system 42 may be described as communicating via operations of the method 96 performed by the broker system 38. Although the method 96 is described below as being performed by the broker system 38, it should be understood that any suitable control device, such as the industrial control system 12, may perform the method 96. Moreover, although the following description of the method 96 is described in a particular order, it should be understood that the method 96 may be performed in any suitable order.

At block 98, the broker system 38 may receive data that may be in a first format from the industrial automation device 66A. The data may include status data, sensing data, or any suitable type of data. Furthermore, the data may be communicated to the broker system 38 according to any suitable communication protocol and having any suitable data type, such as WI-FI®, mobile telecommunications technology (e.g., 2nd generation (2G), 3rd generation (3G), 4th generation (4G), 5th generation (5G), long-term evolution (LTE)), BLUETOOTH®, near-field communications technology, and the like. The communication component 48 may include a network interface to enable communication via various protocols such as ETHERNET/IP®, CONTROLNET®, DEVICENET®, MODBUS®, or any other industrial communication network protocol. For example, the broker system 38 may receive the data from the industrial automation device 66A formatted according to industrial protocol (IP) communications, FIELDBUS® communications, fiber optic communications, wireless communications, wired communications, multi-point interface communications, distributed network protocols, standard-defined protocols, or the like. Furthermore, the broker system 38 may receive analog signals and/or digital signals from the industrial automation device 66A. In this way, the data from the industrial automation device 66A may be of a variety of data types, including integer type, floating-point type, string type, Boolean type, nothing type (e.g., null or NaN data), or the like. The data received from the industrial automation device 66A may correspond to one or more sensed values, such as voltage values, current values, pressure values, temperature values, humidity values, flow rate values, or any suitable type of data. Indeed, for example, the data received from the industrial automation device 66A may also include status information, such as whether a device is in a fault state or is otherwise undesirably operating or desirably operating.

In response to receiving at least some of the data from the industrial automation device 66A, at block 100, the broker system 38 may convert the data from a protocol used by industrial automation device 66A to a common protocol. The common protocol may be a protocol, like a common industrial protocol, used to translate data between data types. The common protocol may be of any protocol type. It is noted that a format of data may be at least partially based on or inclusive of protocols used to communicate the data, the type of data, or the like, where when translating data between formats may involve an adjustment to an amplitude, phase, noise level, data type, communication protocol, or the like from an original format.

At block 102, the broker system 38 may store the data, now common protocol data (e.g., the data of a first format is translated to the common protocol to generate the common protocol data), in memory, such as the memory 46, storage, or the like. In some cases, the broker system 38 may be associated with a redundancy storage system, where the common protocol data stored in the memory 46 may be backed up in one or more databases, additional memory, or the like configurable as redundant storage of the redundancy storage system. Indeed, the broker system 38 may receive data from a variety of industrial automation devices over a period of time and may store the data from each device in its memory 46 or other suitable storage component.

At block 104, the broker system 38 may receive a request from the control system 42 requesting for data from an industrial automation device associated with a parameter. In response to receiving the request from the control system 42, the broker system 38 may query the memory 46 or other suitable storage component to find data matching or substantially suited to respond to a parameter indicated by the request. The parameter may be information related to a type of data, a type of component (e.g., a class of industrial automation device 66 such as motors, drives, or any suitable device classification), a particular identifier of a particular sensed data (e.g., to result in a monitoring of a particular change or update to a value for a sensed value such as a sensed voltage value, a sensed pressure value, a sensed temperature value, a sensed power value, a sensed current value, or any suitable sensed value), an identifier of a portion of an industrial automation system (e.g., a unit, a subsystem), It is noted that a message or data packet transmitted as the request may include data that indicates the parameter. In this way, the parameter of the request may be used by the broker system 38 to determine data requested by the control device 64. For example, the broker system 38 may search the data stored in the memory 46 to identify a subset of the data corresponding to the parameter specified in the request. For instance, the parameter may correspond to an identifier for the industrial automation device 66A and thus may refer to a request for a particular type of data (e.g., "generated data"). As such, the broker system 38 may query the data in the memory 46 for data that corresponds to the identifier (e.g., data generated by the industrial automation device 66A as opposed to the same type of data generated by any of the industrial automation devices 66). In some cases, the parameter may include an indication that the control system 42 is requesting "data related" to the industrial automation device 66A, the broker system 38 may query the data in the memory 46 for data related to the particular industrial automation device (e.g., generated by the particular industrial automation device 66A and/or associated with a monitoring of the particular industrial automation device 66A). Although one particular query is described above, any suitable query may be executed (e.g., performed) by the broker system 38. Furthermore, the request or query may include one or more search qualifiers, one or more query operators (e.g., "AND," "OR," "CONTAINS," "INCLUDES," "EQUALS"), or the like to expedite the query and provide more relevant results. The combination of query operations and parameters may enable the broker system 38 to execute a variety of queries desired by the control system 42 to retrieve any suitable data from the memory 46.

In some embodiments, the request received at block 104 may correspond to a subscription request that the control system 42 may request to be received from the industrial automation device 66A (e.g., identified by the parameter) via the broker system 38. When the control system 42 is subscribed to a data source (e.g., industrial automation device), a type of data (e.g., the data associated with the parameter), or another suitable output from the broker system 38, the control system 42 may receive data from the broker system 38 associated with the data source, the type of data, or the like, after the broker system 38 acquires the data from the respective data source. For example, when the industrial automation device 66A transmits data to the broker system 38, the broker system 38 may convert the data and transmit the converted data to each of the subscribing devices (e.g., one or more control devices of the control devices 64). In some cases, the broker system 38 may transmit (e.g., publish) the converted data to a data channel between the broker system 38 and the one or more control devices 64. The control devices 64 may access the data channel and receive a subset of the data transmitted by the broker system 38. When the broker system 38 publishes data to the data channel, the control system 42 may receive a subset of the published data corresponding to the parameter of the request.

The data channel may include virtual data pathways (e.g., between layers, between transport layers or application layers), wireless data pathways, or physically wired data pathways for routing data between the broker system 38 and the one or more control devices 64. The broker system 38 may also be able to change the pathways, such as in response to the request, parameters of the request, and/or subscription parameters (e.g., definitions that describe which control devices 64 are to receive what subsets of published data). The broker system 38 may establish a respective routing protocol for published data before transmitting the data to the one or more control devices 64. That is, after receiving a subscription request, the broker system 38 may identify a data channel, a time slot, or any other setting in which to send data to a subscribing device.

At block 106, in response to receiving the request at block 104, the broker system 38 may retrieve the common protocol data from block 102 that corresponds to the parameters of the request from the memory 46 or other suitable storage component. The broker system 38 may determine that the common protocol data corresponds to the parameter when executing the query based on the parameter of the request. In response to querying the memory 46 based on the parameter of the request, the broker system 38 may identify a subset of data stored in the memory 46 as relevant or associated with the parameter or other information included in the request. In some embodiments, since the data acquired from different components (e.g., industrial automation devices) may initially be acquired in different data formats, the data stored in the common protocol may enable more efficient and effective querying services for data provided by different components having different formats.

At block 108, the broker system 38 may convert the common protocol data into a protocol used by the control system 42. Similar to the industrial automation device 66A, the protocol used by the control system 42 may be any suitable protocol. In this way, the broker system 38 may transmit the data from the industrial automation device 66A to the control system 42 according to any of the industrial protocols, communication protocols, and/or communication techniques described herein and/or any suitable methods not specifically discussed herein.

At block 110, the broker system 38 may transmit the converted data to the control system 42. In this way, the converted data may include the data received from the industrial automation device 66A at block 98 translated to the data format interpretable by the control system 42. The converted data transmitting to the control system 42 may also include data from other industrial automation devices 66, including sensing data, statuses, or the like. The control system 42 may then use the converted data in any suitable operation performed by the control system 42. Functionally, the control system 42 receives the same information as it may receive in a direct communication with the industrial automation device 66A, however the information is transmitted in a format interpretable by the control system 42, as opposed to a format used by the industrial automation device 66A. Furthermore, the communicative coupling used to transmit the information from the industrial automation device 66A to the control system 42 may be relatively more efficient and easier to repair or maintain when compared to systems that use direct communication between the industrial automation device 66A and the control system 42 without use of a broker system 38. That is, a direct communication link between the industrial automation device 66A and control system 42 may involve the control system 42 performing several translations (e.g., transformations, conversions) between the data originally received from the industrial automation device 66A and usable by the control system 42. Moreover, the computing resources involved in enabling the control system 42 to perform the conversions may cause the processor size to be larger, the storage capacity to be larger, and the like. By using the broker system 38 to perform the storage operations, data conversion operations, and data transmission operations, the broker system 38 may provide these services for a number of devices, while allowing the devices to perform their respective operations.

With the foregoing in mind, FIG. 4 describes an example uni-directional data flow facilitated by the broker system 38. However, data flow between components and the broker system 38 may be bi-directional. In this way, a device may transmit data to the broker system 38 and may receive data from the broker system 38. It is noted that bi-directional communications between a device and the broker system 38 may occur at least partially at a same time when a suitable number of transmitting circuits, receiving circuits, or both, is present as to not cause interference between the communications, such as a transmit operation interrupting a receive operation.

Figure 5:
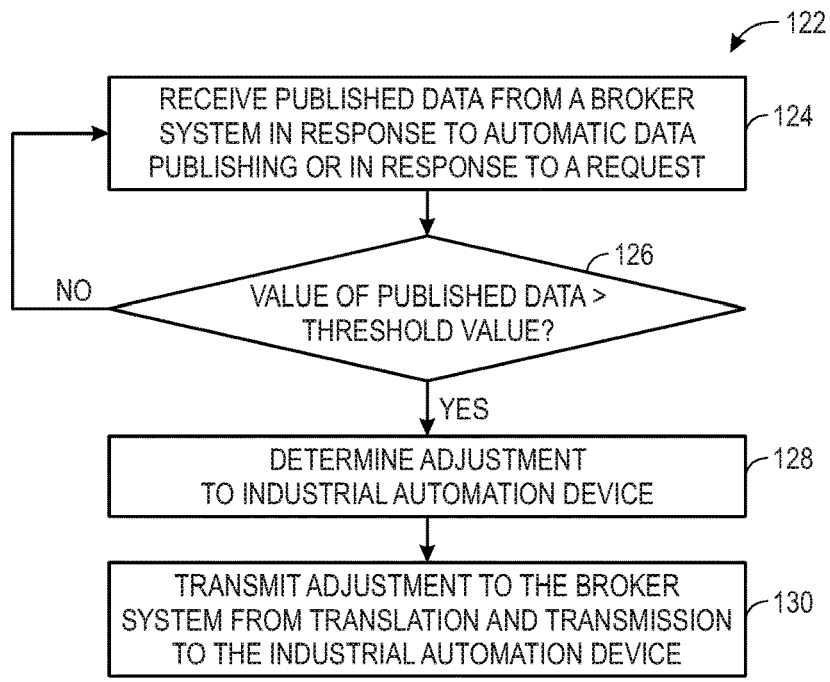
FIG. 5 is a flowchart of a method for controlling an operation of an industrial automation device of FIG. 1 using the broker system of FIG. 2, in accordance with an embodiment.

To elaborate, FIG. 5 is a flowchart of a method 122 for operating the control system 42 to transmit and receive data from the broker system 38, and thus bi-directionally communicate with the broker system 38. Although the method 122 is described below as performed by the control system 42 to communicate with the industrial automation device 66A via the broker system 38, it should be understood that any suitable control device, such as the industrial control system 12, one or more of the control devices 64, one or more industrial automation devices 66, may perform the method 122. Moreover, although the following description of the method 122 is described in a particular order, it should be understood that the method 122 may be performed in any suitable order.

At block 124, the control system 42 may receive published data from the broker system 38 based on a request to receive certain types of data via the broker system 38. The control system 42 may generate the request, such as the request received by the broker system 38 at block 104 of FIG. 4. The request may include information that the broker system 38 uses to query the memory 46 of the broker system 38, such a date range, an identifier of a target device, a type of data requested to be retrieved, an operation that the data requested to be retrieved is related to, or the like.

In some cases, the control system 42 may subscribe or specify that it wishes to receive data from the broker system 38. As part of the subscription service, the control system 42 may receive some or all data transmitted to the broker system 38 from other components (e.g., industrial automation devices 66). Furthermore, in some cases, the control system 42 may define which subsets of data that it wants to receive from the broker system 38. For example, the control system 42 may subscribe to data from a subset (e.g., one or more) of the industrial automation devices 66 without subscribing to data from all industrial automation devices 66 or without subscribing to each device of the motor control center 82.

At block 126, the control system 42 may determine whether a value of the received data (e.g., published) is greater than or equal to a threshold value. The analysis operation associated with block 126 may be used to determine how to respond to particular data received from the broker system 38. In this way, when the control system 42 determines that the value of the published data is not greater than or equal to the threshold value, the control system 42 may determine to not perform an adjustment based on the value of the published data and may continue, at block 124, to receive additional published data from the broker system 38. This may also involve storing the published data before returning to perform operations of block 124, such as to perform a trending analysis operation and/or to use the published data in another operation.

However, at block 126, if the control system 42 determines that the value of the published data is greater than or equal to the threshold value, the control system 42 may proceed, at block 128, to determine an adjustment to the industrial automation device 66A. The control system 42 determines the adjustment to generally correct an operation of the industrial automation device 66A flagged by the value of the published data being greater than or equal to the threshold value. The adjustment may include a change in operation, a change in operational set points, a change in operating limits, a change in sensing frequencies (e.g., how often sensing operations are occurring by the industrial automation device 66A), or the like. For example, the control system 42 may change the operation of the industrial automation device 66A to correct values associated with operation of the industrial automation device 66A, to increase a rapidity of sensing to glean more information about operation of the industrial automation device 66A (e.g., which may or may not be used to determine operational adjustments), or the like.

At block 130, the control system 42 may transmit the adjustment to the broker system 38 for translation and transmission to the industrial automation device 66A. In this way, the broker system 38 receives an indication of an adjustment to an operation of the industrial automation device and translates the adjustment (e.g., after translation to the common protocol and storage, similar to operations of block 102 of FIG. 4) to a suitable format to control operation of the industrial automation device 66A.

The analysis performed at block 126 is just one example of a variety of different conditions that the control system 42 may use to analyze published data. In some cases, the control system 42 may determine whether published data is less than a threshold value, whether a calculation performed on the published data yields a value greater than or equal to (or less than) a threshold value, or the like. Indeed, as suggested, the control system 42 may average values received from the broker system 38, use medians and/or ranges, perform other suitable computations, or the like to determine an operation to perform in response to receiving the published data.

Furthermore, the broker system 38 may, in some instances, translate the data received from the industrial automation device 66A directly into a format used by the control device 64. This may happen when, for example, a status or data is flagged by the industrial automation device 66A, the broker system 38, or one or more of the control devices 64, or the like as having a relatively elevated priority. Skipping translation to the common communication format may reduce a total time of transmission between the industrial automation device 66A and the control system 42. In some cases, the broker system 38 may translate the data to the format used by the control device 64 before translating the data to the common communication format for backup of the data.

Figure 6:
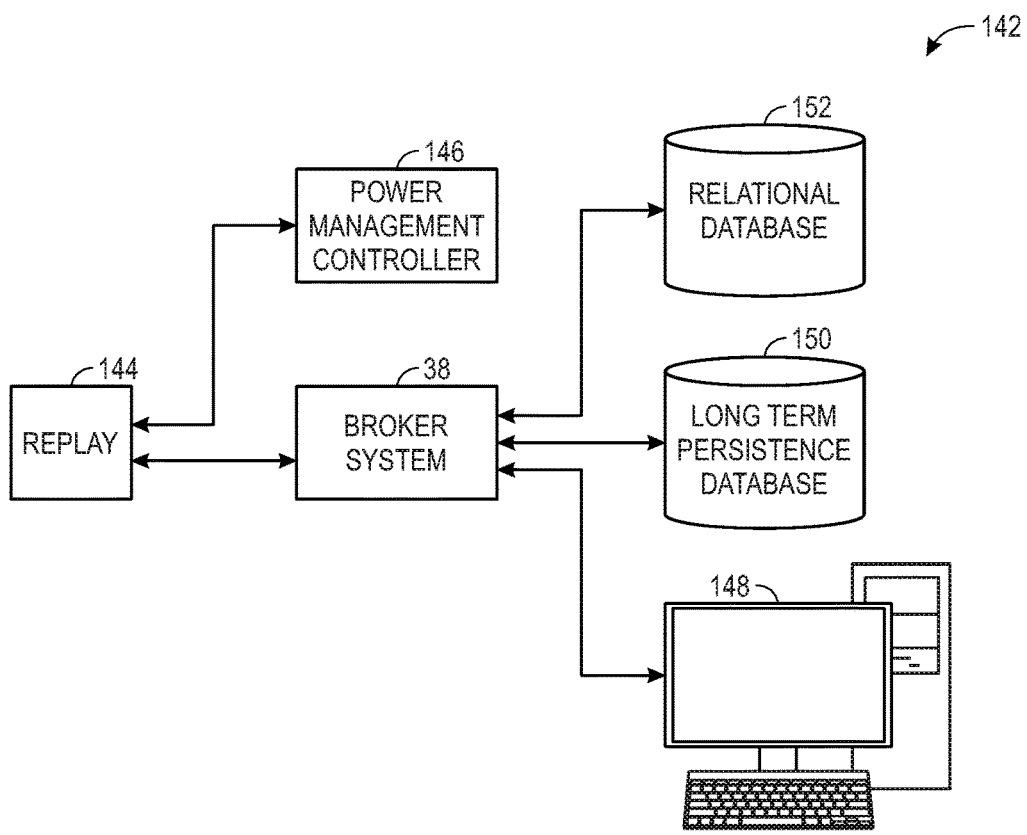
FIG. 6 is a block diagram of an additional example of the broker system of FIG. 2, in accordance with an embodiment.

Keeping the forgoing in mind, FIG. 6 is a block diagram of an example portion 142 of the industrial automation system 10 that uses the broker system 38 to manage communications between industrial automation devices 66 and a relay 144. The relay 144 may be a solid-state device that opens or closes conductive contacts in response to a control signal. In this way, an operational state of the relay 144 (e.g., open state, closed state) may change an operation of a device of an industrial automation system 10. For example, a motor drive may include one or more relays, where the combination of operational states of the one or more relays may operate the motor drive, and thus a motor associated with the motor drive, into different operational modes (e.g., on, off, start-up).

The broker system 38 may receive sensing data, status data, or other suitable information from the relay 144, such as on a wired connection or a wireless connection coupling the broker system 38 to an output terminal of the relay 144. The relay 144 may receive control signals from the broker system 38 and may receive power signals from a power management controller 146. An operator workstation 148 may subscribe to updates (e.g., information transmitted from the broker system 38) from the relay 144 via the broker system 38. Thus, when the relay 144 sends new information to the broker system 38, the broker system 38 may perform operations similar to that of the method 96 of FIG. 4 to translate and transmit the information from the relay 144 to the operator workstation 148. The operator workstation 148 may use the information from the broker system 38 associated with the relay 144 to update a graphical user interface, an HMI (e.g., HMI 68), or other suitable display device with an indication corresponding to the information. For example, a current state of the relay 144 may be represented by a graphic rendered by the operator workstation 148, and thus an appearance of the graphic may be updated by the operator workstation 148 in response to receiving the information. The operator workstation 148 may perform computations using the data received from the broker system 38, may use the data to determine a control action as a command to transmit to the broker system 38, or the like. A control device 64 may use one or more commands, one or more computation results, or the like, when adjusting (e.g., determining to adjust) an operation of the industrial automation system 10.

The broker system 38 may store data in a database 150, a database 152, or the like, such as any suitable storage device or memory device. The database 150 may be a long-term persistence database associated with backing up of data for long term storage. The database 150 may perform its own data refresh operations to keep stored data fresh and stable. The database 152 may be a relational database that stores data and relationships between the data. In this way, the database 152 may store information that identifies sensing data in addition to metadata associated with the sensing data, such as a source device for the sensing data. When the relay 144 generates sensing data, status information, or other suitable information for storage by the broker system 38 in the database 152, the sensing data and/or status information may be stored in the database 152 in the common communication format, as well as with relationship data regarding a relationship to each other, to the relay 144, or the like. Other relationships may be captured in the database 152, such as a department indication and/or other operational information associated with capture of the sensing data, the status information, or the like. These relationships and/or metadata may help provide a more complete view of system operation at a time of capture of the sensing data and/or status information (e.g., facilitate with analysis and/or debugging), and thus may be referenced using the broker system 38 to provide insight for computations, control decisions, or the like.

In some cases, referring briefly back to FIG. 3, a request may serve to subscribe the control system 42 to data from the industrial automation device 66A, to data associated with the parameter, or the like. When subscribed, the control system 42 may receive data published by the broker system 38 associated with the data source and/or the type of data. For example, when the industrial automation device 66A transmits data to the broker system 38, the broker system 38 may convert the data and transmit the converted data to each of the devices (e.g., one or more control devices of the control devices 64) that subscribed to the data. In some cases, the broker system 38 may transmit (e.g., publish) the converted data to a data channel between the broker system 38 and the one or more control devices 64. The control devices 64 may access the data channel and receive a subset of the data transmitted by the broker system 38 corresponding to the respective requests of the control devices 64. In this way, the broker system 38 may publish data to the data channel, and the control system 42 may receive a subset of the published data corresponding to the parameter of the request. The data channel may include one or more virtual data pathways, one or more wireless data pathways, one or more wired data pathways, or the like for routing data between the broker system 38 and the control system 42 and/or one or more control devices 64 based on the parameter of the requests and/or subscription parameters (e.g., definitions that describe which control devices 64 are to receive what subsets of published data). The broker system 38 may establish the respective routing before transmitting the data to the one or more control devices 64.

To elaborate, an example of the publish/subscribe operation may include the broker system 38 reading the broker system configuration 84 from memory, from a software application accessible by the broker system 38, or the like. Furthermore, the broker system 38 may read offline configurations from a data store (not depicted in FIG. 3 but should be understood to be a database and/or storage system accessible by the broker system 38 through any suitable communicative coupling). Accessing (e.g., reading) the offline configurations may provide to the broker system 38 an indication of configurations of systems outside a subset of industrial automation devices communicatively coupled to the broker system 38 (e.g., outside of the example MCC 82). The broker system 38 may perform a device discovery operation, such as when devices coupled to the broker system 38 are not specifically enumerated or described in the broker system configuration 84 and/or the data store and/or when the broker system 38 is to authenticate industrial automation devices 66 for communication.

During the device discovery operation, the broker system 38 may test each communicative coupling it detects to confirm that a device (e.g., a respective industrial automation device 66) is able to communicate with the broker system 38 via the communicative coupling. After confirmed, or after the communicative coupling is authenticated for use in communication with the device, the broker system 38 may receive data generated (e.g., acquired) by the device. The broker system 38 may publish the data generated by the device to a common communication channel to couple the broker system 38 with one or more of the control devices 64. One or more of the control devices 64 may subscribe to the data published by the broker system 38, and thus receive the data generated by the device from the broker system 38. In some cases, the broker system 38 translates the data to the common protocol.

In some cases, the broker system 38 may sometimes perform authentication operations by comparing a list of discovered devices (e.g., discovered devices of the MCC 82) to a list of expected devices before permitting data to be transmitted to it, before receiving data from a device, or before performing any operation that may involve receiving data from an unauthenticated device. The broker system configuration 84 may provide an indication of the list of expected devices to the broker system 38. When a device is discovered that is not on the list of expected devices, the broker system 38 may ignore or disregard data transmitted from the device, may generate an alert indicating the discovery of the inconsistency (e.g., deviation), or the like to generally reject communication with the unauthenticated device. The generation of the alert may cause the broker system 38 to translate the alert into a format interpretable by one or more of the control devices 64. The broker system 38 may transmit the alert to one or more of the control devices 64. One or more of the control devices 64 may perform a wide variety of operations in response to the alert, such as performing an operation to address the concern associated with the alert, generating an additional alert or notification, or the like. For example, the HMI 68 may update a rendering of a graphic in response to receiving the alert, the IoT platform 78 may instruct a camera sensor to power on and to start collecting image data to record the discovered device in question), or the like.

As described above, MQTT may be used to support the broker system. A broker system 38 using MQTT may be thought of as a server connected to client devices (e.g., control devices 64, industrial automation devices 66) or subsystems (e.g., MCC 82). One benefit of MQTT is that if a connection is unavailable between a client device (e.g., control devices 64, industrial automation devices 66) and the broker system 38, the broker system 38 may buffer messages in a queue until the client device becomes available, and may publish messages to the subscriber when the client device becomes available. Another benefit of MQTT is that if a connection between a client device publishing to a broker system 38 is severed, the broker system 38 may send a message to each communicatively coupled client device remaining and alerting them of the absence of the severed client device. To identify the severed connection, the broker system 38 may transmit a test message to the client devices, such as periodically, on a regularly interval, in response to an event occurring (e.g., trigger event), or the like, to determine if the connection is still valid. The broker system 38 may also wait for a confirmation message from the client device, and if a duration of time longer than a threshold amount of time passes (e.g., communication confirmation times out), the broker system 38 may determine that the connection is severed. The broker system 38, in this case, may force-close (e.g., end) the connection (e.g., communication) to the severed client device without operator intervention, such as changing a publish setting to stop outgoing communications from transmitting to the severed client device. Furthermore, the broker system 38 may transmit an indication (e.g., notification, message) to the control device 64 (e.g., HMI) to notify an operator that the communication with the client device has ended.

Figure 7:
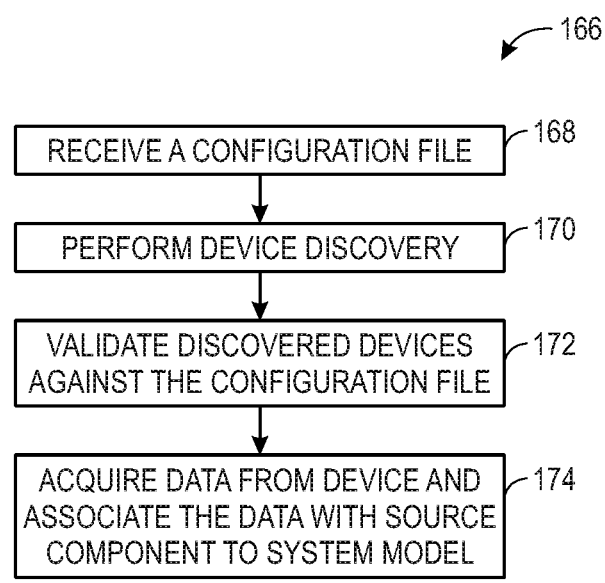
FIG. 7 is a flowchart of a method for validating devices for communication using the broker system of FIG. 2, in accordance with an embodiment.

FIG. 7 is a flowchart of a method 166 for validating devices when preparing for communication using the broker system 38. Although the method 166 is described below as performed by the broker system 38, it should be understood that any suitable control device, such as the industrial control system 12, may perform the method 166. Moreover, although the following description of the method 166 is described in a particular order, it should be understood that the method 166 may be performed in any suitable order.

At block 168, the broker system 38 may receive a configuration file corresponding to a system to be added to the industrial automation system 10, such as a plant expansion, one or more additional components, a new unit, a new MCC, a new substation, or the like. The configuration file received may include a control file in a software package accessible by or transmitted to the broker system 38, where the configuration file may include Extensible Markup Language (XML) data, an XML file, or other suitable format. The received configuration file may be included in a purchase order associated with one or more components purchased for implementation in the industrial automation system 10. Furthermore, the received configuration file may be added to a system model maintained by the broker system 38. The system model may be a digital representation of a component hierarchy of the industrial automation system 10, equipment relative relationship within the industrial automation system 10, a network connection model between components in the industrial automation system 10, and the like. The system model may be used by the broker system 38 to manage the reception and transmission of data using a network model that describes the communication channels available to each respective communicative coupling and/or the network data pathways available in the industrial automation system 10. For example, when the MCC 82 is purchased for the industrial automation system 10, the MCC 82 may physically include the industrial automation devices 66 and a configuration file may describe the physical layout or arrangement of the industrial automation devices 66.

In addition, the configuration file may specify industrial automation devices 66 that are expected to be included in the MCC 82, as well as a relative placement of each of the industrial automation devices 66, an internet protocol (IP) address for each of the industrial automation devices 66, as well as an hierarchical placement within the industrial automation system 10 the MCC 82 (e.g., a system, a sub-system, a portion, an electrical line, or the like). Based on the relationships (e.g., data transmission pathways and/or component hierarchies) specified in the configuration file, the broker system 38 may integrate the relationship data regarding the components within the MCC 82 to the system model maintained for the industrial automation system 10. The system model may then illustrate or depict a list of components connected to the MCC 82, a list of electrical power sources, a list of components that provide control signals, and other related information for each component included within the MCC 82.

Before adding the components data specified in the configuration file to the system model, the broker system 38 may, at block 170, perform a device discovery operation based on the available communication channels or ports available to the broker system 38. During the device discovery operation, the broker system 38 may test a communicative coupling to confirm that a device is present and able to communicate with the broker system 38 via the communicative coupling. For example, the broker system 38 may identify the IP addresses (e.g., networking addresses) for each industrial automation device 66 and/or control device 64 communicatively coupled to the broker system 38. The broker system 38 may store in memory a list of devices discovered using operations of the block 170, such as storing a list of identifiers for each device discovered using operations.

At block 172, the broker system 38 may validate the discovered devices against the components listed in the configuration file. To do so, the broker system 38 may compare indications of expected devices and/or expected device IP addresses to those devices and/or IP addresses actually discovered. When there is an inconsistency and a discovered device does not match a device in the list of expected devices and/or an expected device is missing from the discovered devices, the broker system 38 may generate an alert to be presented via the HMI 68, to be output via the alarm management system 72, or the like. After verifying that the discovered devices match the components specified in the configuration file, the broker system 38 may add the components specified by the configuration file to the system model and/or initialize communication with the discovered devices. Furthermore, the broker system 38 may install or configure components specified in the configuration file to each discovered and validated device. The installation or configuration of devices may be reflected as an update the system model. Furthermore, the system model maintained by the broker system 38 may perform data abstraction operations that permit the broker system 38 to receive data from discovered devices and to link the data back to the system model for updates. Moreover, the broker system 38 may store the received data in a historical log accessible by way of reference to the model. As data becomes available for publishing, the broker system 38 may use the system model to prepare or send the data according to a desired format (e.g., isolated, separated, packaged as a part as opposed to a whole).

At block 174, the broker system 38 may acquire data from a respective device and associate the data with its source component, such as an IP address corresponding to the respective device, to the system model. In this way, the broker system 38 may associate the data received from the respective device to a portion of the system model managed by the broker system 38. Adding data to the overall system model in this way may generate an updated logical view of each component relative to the industrial system 10 (e.g., respective child or parent devices of each component). Moreover, the system model may specify a relative location for each component, physical switches that are used to control data transmission to and/or from each component, routers connected to the components, and the like. Before adding the data to the system model, the broker system 38 may perform calculations using the data and/or otherwise orchestrate further analysis or sorting of the data. The broker system 38, when performing data orchestration operations, may receive many different data points and organize the different data points for analysis, modeling, and collection. This operation may be relatively more efficient by using one query to retrieve fifty data points, as opposed to performing orchestration operations using fifty individual queries to gather the fifty different data points. For example, the respective device may output data that is relevant for both the respective device and another device, such as the sub-system as a whole, the MCC 82, a category of devices, or the like. In this way, when the data is relevant for multiple parts of the system model, the broker system 38 may route the data to the different parts of the system model for association with the IP address and/or for storage in the repository. Thus, the broker system 38 may support and multi-in/multi-out transmission system that dynamically routes and translates data between various generation-points (e.g., source devices) and end-points (e.g., sink devices).

When routing data between devices of the industrial automation system 10, the broker system 38 may reference the system model to determine an efficient network path to transmit the data. For example, the broker system 38 may initiate collecting data from a sensor (e.g., example of an industrial automation device 66) and determine a network route to follow to retrieve the data from the sensor, such as identifying a set of network switches to control to route the data from the sensor to the broker system 38. A similar operation may be applied to network switches associated with control devices 64. For example, the broker system 38 may control certain network switches to route data to a respective control device 64 and/or to receive a command from the respective control device 64.

The model described above may be used to mass-deploy commands and/or other actions to one or more devices of the industrial automation system 10. For example, just as a configuration file may be used to validate newly installed industrial automation devices 66 added to the system model, configurations files may additionally or alternatively be used to validate new control devices 64 added into the system model. Indeed, the broker system 38 may provide a return path of data for control of a data-generating device (e.g., control device 64, industrial automation device 66). This return path may specify a destination in which a control device 64 may direct data towards. For example, the return path may correspond to an application (e.g., software) of the broker system 38. After receiving a command, the broker system 38 may access the model to determine a device tag corresponding to the device that is targeted by the command. To access the model, the broker system 38 may logically deconstruct the system model to access information stored within the information hierarchy of the system model. Indeed, the situation may arise where the command from the control device 64 is targeting a device that originally generated data used by the control device 64 to determine the command. This example exemplifies bi-directional communication capabilities of a communication network deployed with the broker system 38. However, it is noted that the broker system 38 may enable a wide variety of combinations of data pathways, and the system model may represent an end-to-end model or a relatively comprehensive model for each data pathway that intersects with the broker system 38.

Using these indications of the data pathways may permit the broker system 38 to receive one command from one control device 64 and deploy the command to entire sections of the industrial automation system 10 or subsets of components of the model by referencing the devices included in the hierarchy of the model. For example, the HMI 68 may receive an input indicating to shut down or remove power from the MCC 82. Thus, the broker system 38 may determine which of the components of the MCC 82 are currently powered on (e.g., by reading voltage data or other sensed data output from one or more components of the MCC 82). For the components that are powered on, the broker system 38 may, using the model, determine which networked components to use to electrically isolate and power-off the components to permit the MCC 82 to be powered off in a controlled manner. A similar process may be used to deploy batch commands to entire units, such as to change an operating speed of a type of motor (e.g., via deployment of command and/or operating settings to respective drives for the motors), or the like. Indeed, the broker system 38 may reference the system model to retrieve IP addresses for devices of the hierarchical system model. In some cases, one IP address may be used to reference each device under a sub-system in the hierarchy, such as when each device uses a same or otherwise compatible communication protocol or are of the same device. For example, transmitting a command to an IP address corresponding to the MCC 82 may enable the broker system 38 to transmit respective commands to each device of the MCC 82 using one command to the MCC 82. Furthermore, it is noted that the system model may be stored in a storage repository for the broker system 38 to access and add to and/or remove from over time (e.g., when components are added or removed from the industrial automation system 10).

To keep the system model updated, the broker system 38 may perform an audit. The broker system 38 may perform the audit on a periodic schedule, such as part of a maintenance schedule, after a specified amount of time passes, or the like. Sometimes, the broker system 38 may perform the audit not on a periodic schedule, such as in response to a control signal (e.g., a command from the HMI 68), in response to a condition being satisfied (e.g., the broker system 38 discovering a new IP address), or the like. To perform the audit, the broker system 38 may repeat performing the method 166 across one or more portions of the industrial automation system 10, or may perform other suitable verification operations.

In some systems, the broker system 38 may transmit a test message to the first industrial automation device and start a counter. The broker system 38 may force a communicative coupling to the first industrial automation device (e.g., control devices 64, industrial automation devices 66) to end in response to a count of the counter reaching a threshold value. In response to ending the communicative coupling, the broker system 38 may transmit an indication to a third industrial automation device (e.g., control devices 64, industrial automation devices 66), such as a HMI, where the indication communicates to the third industrial automation device that communication with the first industrial automation device timed out. Indeed, this one-to-many capability of the broker system 38 may enable the connected client device to focus on its operation, and not permit the delivery of data to an application or subsystem. The broker system 38 may still store the data generated by the first industrial automation device even if the data is not being transmitting on to the third industrial automation device. Provided how the MQTT protocol is also able to be deployed using relatively low amounts of power, the MQTT protocol permits effective communication even between resource constrained clients, and permits communication between many applications.

To provide another example of an operation of the broker system 38, within a pulping process, multiple sensors measuring humidity, temperature, chemical content, tank levels, rotational speed, as well as other signals are embedded within various portions of the pulping process. A local control system or supervisory control system may use many of these signals within a control strategy or larger distributed control strategy. Additionally, these signals may also be used in a human machine interface, operator workstation, long term persistence database, as well as a reporting client. Rather than devices of the pulping process having to maintain four connections to the subsystems plus an additional connection to the control system to execute a control strategy, a broker system 38 may be used to manage communications of the system. With the insertion of the broker system 38, fewer connections need to be made to a sensor, for example, one connection to the broker system 38 as opposed to four connections to the subsystems. By modeling the devices communicatively coupled to the broker system 38, for example, according to the MQTT protocol, each subsystem may effectively consume, analyze, and present the data in a format that is easy to exchange with the other devices.

Thus, technical effects of the present disclosure include techniques for providing a broker system to communicate between wide varieties of industrial automation devices and control devices. The broker system may leverage a common communication format (e.g., common protocol) to translate data from a protocol used by the industrial automation device to a protocol used by the control device when transmitting data between the industrial automation device and the control device. In some cases, the broker system may store the data after translation to the common communication format in memory for subsequent use in historical analysis. The control devices may request specific data from the broker system (e.g., data from a particular device, data from a particular unit or portion of an industrial automation system), may subscribe to particular devices or particular subsets of devices to receive data output to the broker system by the devices, may subscribe to all updates (e.g., all data and/or statuses) from one or more devices of an industrial automation system, or the like. Leveraging a broker system in an industrial automation system may improve communication technology since communications may be deployed in an improved and/or more efficient manner. Furthermore, an industrial automation control system that uses a broker system may be easier to maintain over time since, for example, fewer respective couplings may be used between components in the system. Furthermore, data generated by the industrial automation devices, the control devices, the broker system, or the like may be more readily or easily backed up in databases since the communications transmit through a common distribution device (e.g., the broker system).

Moreover, the present embodiments described herein provide a data orchestration step such that data received from devices is ingressed or routed to the broker system 38. The broker system 38 may logically orchestrated the data to match the physical arrangement and the logical network specified in the MCC model. The broker system 38 may perform certain types of analysis (e.g., translation, grouping) on the received data according to a data object model that may be specified as part of the MCC model. Both the MCC model and the data object model may be transmitted and egressed from the broker system 38 to multiple clients or data recipients, In addition, the data object model or the MCC model may provide a return path for the data received by the broker system 38 to facilitate the control of other devices. That is, the MCC model may specify that data received from a particular component may be routed to other components via the broker system 38. As such, the return path may specify that data received from application, according to the model, may be routed to an individual device. In some embodiments, the model may be deconstructed to determine the individual tags and devices to route the data.

Moreover, the embodiments described herein may be used to configure a system of devices via the broker system 38, validate configuration for control with a control system via the broker system 38, provide infrastructure and device configuration validation via the broker system 38, monitor this configuration and provide audit updates when configuration changes are made to the system via the broker system 38, and the like.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A system, comprising:
   a first industrial automation device configured to generate a first set of data according to a first protocol;
   a second industrial automation device configured to generate an automation command configured to control the first industrial automation device based at least in part on the first set of data, wherein the second industrial automation device is configured to interpret data formatted according to a second protocol different from the first protocol; and
   a broker system coupled between the first industrial automation device and the second industrial automation device, wherein the broker system is configured to perform operations comprising:
      receiving the first set of data from the first industrial automation device over a period of time;
      converting the first set of data from the first protocol to a third protocol different from the first protocol and the second protocol thereby generating a second set of data;
      storing the second set of data in a storage component, wherein the second set of data is of the third protocol;
      receiving a request from the second industrial automation device to subscribe to receiving the first set of data;
      retrieving, by the broker system, configuration data associated with one or more operations of the first industrial automation device and the second industrial automation device, wherein the configuration data comprises one or more publish relationships, one or more subscription relationships, or both between the first industrial automation device and the second industrial automation device, and wherein the request from the second industrial automation device to subscribe to receiving the first set of data is not included in the one or more subscription relationships;
      querying the storage component to retrieve the second set of data based on the request to subscribe to receiving the first set of data;
      querying the storage component for one or more additional sets of data that corresponds to the one or more publish relationships, the one or more subscription relationships, or both, wherein the one or more additional sets of data are stored in the third protocol;
      converting the second set of data and the one or more additional sets of data from the third protocol to the second protocol thereby generating a third set of data in response to determining that the second industrial automation device is requesting to subscribe to receiving the first set of data and based on the configuration data; and
      transmitting the third set of data to the second industrial automation device.

2. The system of claim 1, wherein the second industrial automation device is designated as a subscriber to information generated by the first industrial automation device, and wherein the operations comprise publishing the third set of data to a data channel accessible to the second industrial automation device in response to the second industrial automation device being the subscriber.

3. The system of claim 1, wherein, when the second industrial automation device is configured to transmit the automation command to the first industrial automation device via the broker system, and wherein the broker system is configured to perform the operations comprising:
receiving the automation command in the second protocol from the second industrial automation device;
converting the automation command from the second protocol to the third protocol;
converting the automation command from the third protocol to the first protocol; and
transmitting the automation command in the first protocol to the first industrial automation device.

4. The system of claim 3, comprising a third industrial automation device configured to communicate according to a fourth protocol, wherein the operations comprise:
determining that the third industrial automation device is a subscriber of the automation command;
converting the automation command from the third protocol to the fourth protocol; and
transmitting the automation command in the fourth protocol to the third industrial automation device to operate the third industrial automation device based at least in part on the first set of data.

5. The system of claim 1, wherein the operations comprise transmitting the data formatted according to the second protocol to the second industrial automation device while receiving an additional automation command formatted according to a different protocol from an additional industrial automation device.

6. The system of claim 1, wherein the second industrial automation device comprises:
a control system;
a human machine interface (HMI);
a supervisory control and data acquisition (SCADA) system;
an alarm management system;
a time-series data repository;
a manufacturing execution supervisory (MES) system;
an internet-of-things (IOT) platform system; and
a computerized maintenance management (CMMS) system;
or any combination thereof.

7. The system of claim 1, wherein the broker system is configured to perform operations comprising:
receiving a configuration file indicative of a first plurality of network addresses;
perform a device discovery for one or more devices coupled to the broker system to identify a second plurality of network addresses associated with the one or more devices;
compare each network address of the first plurality of network addresses to each network address of the second plurality of network addresses to determine one or more matching network addresses; and
validate the one or more devices based on the one or more matching network addresses, wherein the validated one or more devices comprise the first industrial automation device and the second industrial automation device.

8. The system of claim 1, wherein the operations comprise:
determining that a third industrial automation device is unable to receive a fourth set of data from the broker system; and
terminating a communicative coupling to the third industrial automation device in response to determining that the third industrial automation device is unable to receive the fourth set of data.

9. The system of claim 1, wherein the second industrial automation device is a subscriber to information related to a parameter, and wherein the operations comprise:
determining that a fourth set of data stored in the storage component corresponds to the parameter; and
automatically routing the fourth set of data to the second industrial automation device in response to the determining that the fourth set of data corresponds to the parameter.

10. The system of claim 1, wherein the broker system is configured to convert the second set of data into the first set of data or a third set of data associated with the second protocol.

11. A method, comprising:
receiving, via a processor, a first set of data formatted according to a first protocol from a first device, wherein the first device is configured to generate the first set of data in response to receiving a first control signal from the processor;
generating, via the processor, a second set of data formatted according to a second protocol different from the first protocol based at least in part on the first set of data;
storing, via the processor, the second set of data in a storage component;
receiving a request from a second device to subscribe to receiving the first set of data;
retrieving configuration data associated with one or more operations of the first device and the second device, wherein the configuration data comprises one or more publish relationships, one or more subscription relationships, or both between the first device and the second device, and wherein the request from the second device to subscribe to receiving the first set of data is not included in the one or more subscription relationships;
generating, via the processor, a third set of data formatted according to a third protocol different from the first protocol and the second protocol based at least in part on the second set of data in response to detecting that a second device is a subscriber of the first set of data, wherein the second device is configured to operate with data formatted according to the third protocol, wherein generating the third set of data comprises:
querying, via the processor, the storage component to retrieve the second set of data based on the second device being the subscriber;
querying the storage component for one or more additional sets of data that corresponds to the one or more publish relationships, the one or more subscription relationships, or both, wherein the one or more additional sets of data are stored in the third protocol; and
converting the second set of data into the third set of data; and
transmitting, via the processor, the third set of data to the second device, wherein the second device is configured to generate a second control signal formatted according to the third protocol based at least in part on the third set of data.

12. The method of claim 11, comprising:
determining that the second device is inaccessible;
changing a publish setting to stop outgoing communications to the second device in response to determining that the second device is inaccessible; and
queuing the outgoing communications to be transmitted to the second device once accessible again.

13. The method of claim 11, comprising:
receiving a request from the second device;
identifying a parameter of the request;
determining that the third set of data corresponds to the parameter; and
routing the third set of data to the second device in response to determining that the third set of data corresponds to the parameter.

14. The method of claim 11, comprising:
receiving the second control signal from the second device;
generating a third control signal formatted according to the second protocol at least in part by converting the second control signal to the third control signal;
generating a fourth control signal formatted according to a fourth protocol at least in part by converting the third control signal to the fourth control signal; and
transmitting the fourth control signal to a third device configured to operate according to the fourth protocol, wherein the third device is configured to adjust an operation in response to the fourth control signal.

15. The method of claim 11, wherein transmitting the third set of data to the second device comprises publishing the third set of data to a data channel, wherein a plurality of industrial automation devices are subscribed to receive one or more updates provided on the data channel.

16. A non-transitory computer-readable storage medium, comprising processor-executable routines that, when executed by a processor, cause the processor to perform operations comprising:
receiving a first set of data formatted according to a first protocol from a first device, wherein the first device is configured to generate the first set of data as part of a sensing operation performed by the first device;
generating a second set of data formatted according to a second protocol different from the first protocol based at least in part on the first set of data;
storing the second set of data in a storage component;
receiving a request from a second device to subscribe to receiving the first set of data;
retrieving configuration data associated with one or more operations of the first device and the second device, wherein the configuration data comprises one or more publish relationships, one or more subscription relationships, or both between the first device and the second device, and wherein the request from the second device to subscribe to receiving the first set of data is not included in the one or more subscription relationships;
querying the storage component to retrieve the second set of data based on the request to subscribe to receiving the first set of data;
querying the storage component for one or more additional sets of data that corresponds to the one or more publish relationships, the one or more subscription relationships, or both, wherein the one or more additional sets of data are stored in the second protocol;
generating a third set of data formatted according to a third protocol different from the first protocol and the second protocol based at least in part on the second set of data and the one or more additional sets of data; and
transmitting the third set of data to the second device configured to operate according to the third protocol, wherein the second device is configured to determine an adjustment to be applied to an operation of the first device, a third device, or both based at least in part on the third set of data.

17. The non-transitory computer-readable storage medium of claim 16, the operations comprising:
receiving a control signal formatted according to the third protocol from the second device, wherein the control signal is configured to implement the adjustment;
determining that the control signal is to be transmitted to the first device;
converting the control signal to be formatted according to the first protocol in response to determining that the control signal is to be transmitted to the first device; and
transmitting the control signal formatted according to the first protocol to the first device, wherein the control signal formatted according to the first protocol is configured to operate the first device based at least in part on the first set of data.

18. The non-transitory computer-readable storage medium of claim 16, the operations comprising:
receiving a fourth set of data formatted according to a fourth protocol from a third device;
parsing the fourth set of data to identify a parameter;
querying a database in response to receiving the first set of data from the first device to identify a subset of data in the database associated with the parameter;
converting the subset of data to be formatted according to the fourth protocol; and
transmitting the subset of data formatted according to the fourth protocol to the third device.

19. The non-transitory computer-readable storage medium of claim 18, the operations comprising:
receiving a first control signal formatted according to the fourth protocol from the third device;
generating a second control signal formatted according to the first protocol based at least in part on the first control signal; and
transmitting the second control signal to the first device to adjust an operation of the first device.

20. The non-transitory computer-readable storage medium of claim 16, the operations comprising:
transmitting a test message to the first device and starting a counter;
in response to a count of the counter reaching a threshold value, ending a communicative coupling to the first device; and
transmitting an indication to a third device in response to ending the communicative coupling, wherein the indication is configured to communicate that communication with the first device is timed out.

* * * * *